United States Patent
Freese et al.

(10) Patent No.: US 10,367,217 B2
(45) Date of Patent: Jul. 30, 2019

(54) MEMBRANE ELECTRODE ASSEMBLY MANUFACTURING PROCESS

(71) Applicant: W. L. Gore & Associates, Inc., Newark, DE (US)

(72) Inventors: Donald T. Freese, Waikoloa Village, HI (US); F. Colin Busby, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 635 days.

(21) Appl. No.: 14/616,968

(22) Filed: Feb. 9, 2015

(65) Prior Publication Data

US 2016/0233532 A1   Aug. 11, 2016

(51) Int. Cl.
*H01B 7/02* (2006.01)
*H01B 13/06* (2006.01)
(Continued)

(52) U.S. Cl.
CPC ....... *H01M 8/1004* (2013.01); *B32B 37/1292* (2013.01); *C08J 5/2237* (2013.01); *H01M 4/8657* (2013.01); *H01M 4/8807* (2013.01); *H01M 4/8828* (2013.01); *H01M 8/106* (2013.01); *H01M 8/1018* (2013.01); *H01M 8/1039* (2013.01); *H01M 8/1053* (2013.01); *H01M 8/1081* (2013.01); *H01M 8/1086* (2013.01); *B29C 65/483* (2013.01); *B29C 66/43* (2013.01); *B32B 27/08* (2013.01);
(Continued)

(58) Field of Classification Search
CPC ....... H01M 8/1004; H01M 2008/1095; H01M 4/8828; H01M 4/8803; H01M 4/8807; H01M 4/8814; Y02P 70/56; Y02E 60/521; B32B 2457/18; B32B 2037/243; B32B 27/322; B32B 27/08; B32B 37/0084; B32B 37/1292; B29C 65/483; B29C 66/43
USPC .... 156/47, 51, 60, 77, 78, 87, 90, 182, 184, 156/185, 187, 191, 192, 242, 244.11, 156/244.12, 246, 272.2, 273.9, 278, 285, 156/290, 291, 314, 324, 331.7; 429/481, 429/494, 535; 427/115
See application file for complete search history.

(56) References Cited

U.S. PATENT DOCUMENTS 4,532,316 A   7/1985   Henn
5,234,777 A   8/1993   Wilson
(Continued)

FOREIGN PATENT DOCUMENTS

CA   2636518 A1 *   7/2007   .......... H01M 8/1004
JP   H06-176771 A   6/1994
(Continued)

OTHER PUBLICATIONS

International Search Report and Written Opinion for Application No. PCT/US2016/017126 dated Apr. 11, 2016.

*Primary Examiner* — Philip C Tucker
*Assistant Examiner* — Brian R Slawski
(74) *Attorney, Agent, or Firm* — Greenberg Traurig, LLP

(57) ABSTRACT

A method of making a component of a membrane electrode assembly comprising the steps of forming an electrode on an air-permeable backer comprising ePTFE, depositing a mixture comprising ionomer and a water-insoluble alcohol onto said electrode, drying said mixture to form a protective ionomer layer, and depositing an ePTFE-reinforced ionomer layer onto said protective ionomer layer.

33 Claims, 3 Drawing Sheets

(51) Int. Cl.
| | |
|---|---|
| H01B 13/22 | (2006.01) |
| H01B 13/10 | (2006.01) |
| B29C 65/00 | (2006.01) |
| B32B 3/00 | (2006.01) |
| B32B 5/00 | (2006.01) |
| B32B 5/18 | (2006.01) |
| B32B 37/00 | (2006.01) |
| B32B 33/00 | (2006.01) |
| B29C 47/00 | (2006.01) |
| B32B 38/04 | (2006.01) |
| B32B 7/14 | (2006.01) |
| C09J 5/04 | (2006.01) |
| B65C 9/25 | (2006.01) |
| C09J 5/00 | (2006.01) |
| C09J 4/00 | (2006.01) |
| C09J 101/00 | (2006.01) |
| C09J 201/00 | (2006.01) |
| B05D 5/12 | (2006.01) |
| H01M 8/10 | (2016.01) |
| H01M 8/00 | (2016.01) |
| H01M 8/1004 | (2016.01) |
| H01M 8/1018 | (2016.01) |
| H01M 8/1086 | (2016.01) |
| H01M 8/1081 | (2016.01) |
| B32B 37/12 | (2006.01) |
| H01M 8/1039 | (2016.01) |
| H01M 8/1053 | (2016.01) |
| H01M 8/106 | (2016.01) |
| C08J 5/22 | (2006.01) |
| H01M 4/86 | (2006.01) |
| H01M 4/88 | (2006.01) |
| B29C 65/48 | (2006.01) |
| B32B 37/24 | (2006.01) |
| B32B 27/08 | (2006.01) |
| B32B 27/32 | (2006.01) |

(52) U.S. Cl.
CPC ....... *B32B 27/322* (2013.01); *B32B 2037/243* (2013.01); *B32B 2375/00* (2013.01); *B32B 2457/10* (2013.01); *B32B 2457/18* (2013.01); *C08J 2327/18* (2013.01); *H01M 2008/1095* (2013.01); *H01M 2300/0085* (2013.01); *Y02P 70/56* (2015.11)

(56) References Cited

U.S. PATENT DOCUMENTS

| | | | | |
|---|---|---|---|---|
| 5,910,378 | A | * | 6/1999 | Debe .................. C25B 9/10 204/282 |
| 5,998,057 | A | * | 12/1999 | Koschany .............. C25B 9/10 204/283 |
| 6,054,230 | A | | 4/2000 | Kato |
| RE37,307 | E | | 8/2001 | Bahar et al. |
| 6,524,736 | B1 | | 2/2003 | Sompalli et al. |
| 7,306,729 | B2 | | 12/2007 | Bacino et al. |
| 2001/0033958 | A1 | * | 10/2001 | Marchetti ........... H01M 8/0273 429/442 |
| 2006/0035131 | A1 | * | 2/2006 | Obata ................ H01M 8/0202 429/479 |
| 2007/0072036 | A1 | * | 3/2007 | Berta ................. H01M 4/8807 429/432 |
| 2008/0083499 | A1 | * | 4/2008 | Nodono ............. B32B 37/0007 156/324 |
| 2010/0043954 | A1 | * | 2/2010 | Shimoda ............ H01M 4/8605 156/182 |
| 2010/0098991 | A1 | * | 4/2010 | Suzuki ............... H01M 4/8605 429/481 |
| 2011/0070521 | A1 | * | 3/2011 | Ishikawa ............ H01M 8/0289 429/479 |
| 2012/0189942 | A1 | * | 7/2012 | Moose ................ H01M 4/8825 429/481 |
| 2014/0120458 | A1 | | 5/2014 | Jiang et al. |

FOREIGN PATENT DOCUMENTS

| | | | |
|---|---|---|---|
| JP | 2007-056064 | A | 3/2007 |
| JP | 2007-214077 | | 8/2007 |
| JP | 2007-227031 | | 9/2007 |
| JP | 2007-258161 | | 10/2007 |
| JP | 2010-257765 | A | 11/2010 |
| JP | 2011-210737 | A | 11/2010 |
| JP | 2013-161557 | | 8/2013 |
| WO | WO 97/46918 | A1 | 12/1997 |
| WO | WO 03/073540 | A2 | 9/2003 |
| WO | WO 2004/113070 | A2 | 12/2004 |
| WO | WO 2015013764 | A1 * | 2/2015 ............. C25B 15/02 |

* cited by examiner

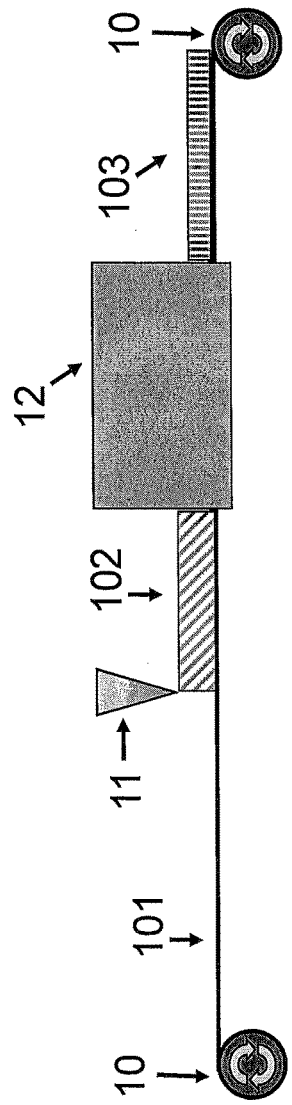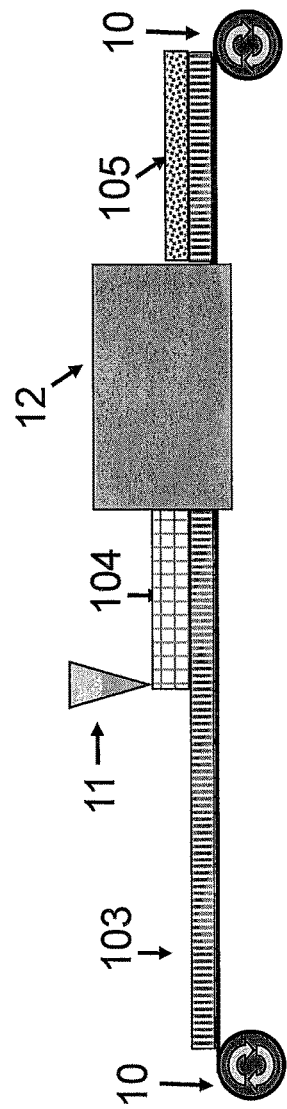

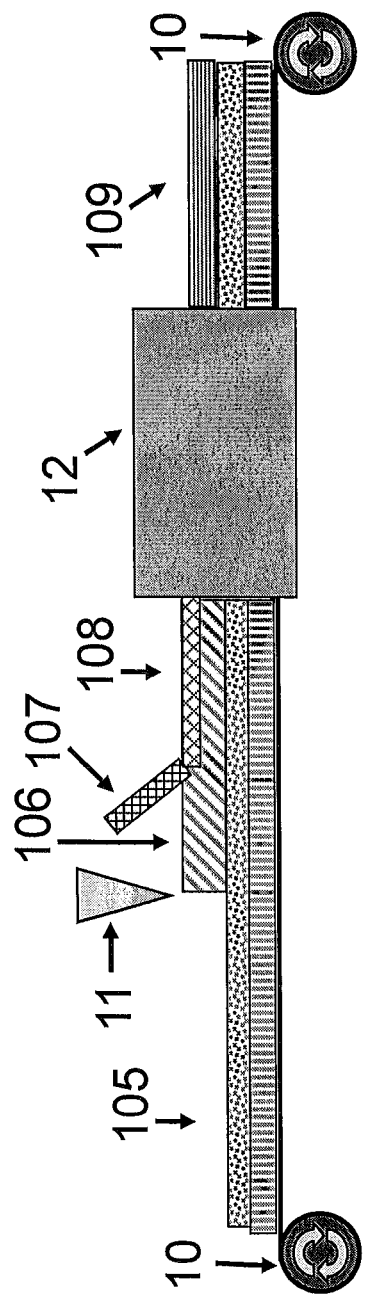
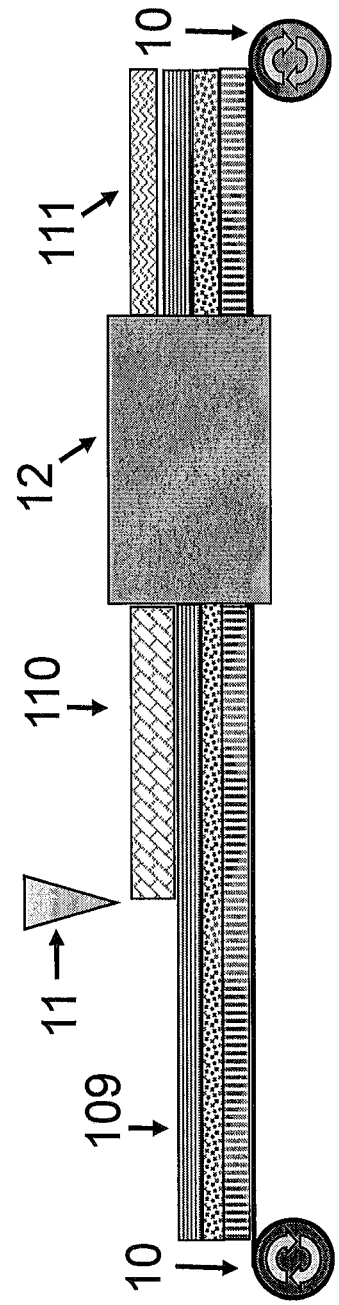
FIG. 3
FIG. 4

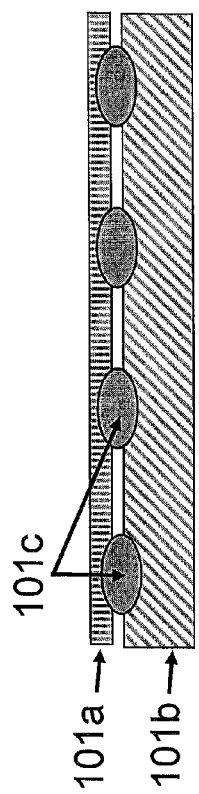
FIG. 5
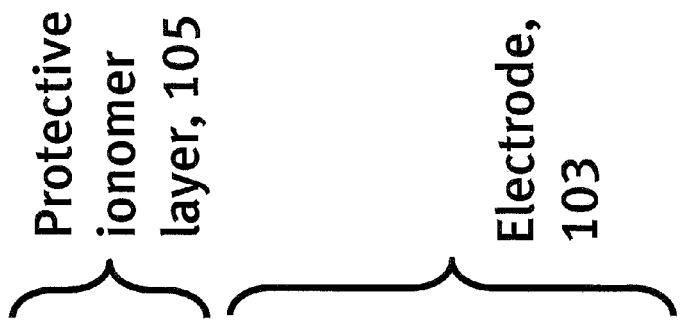
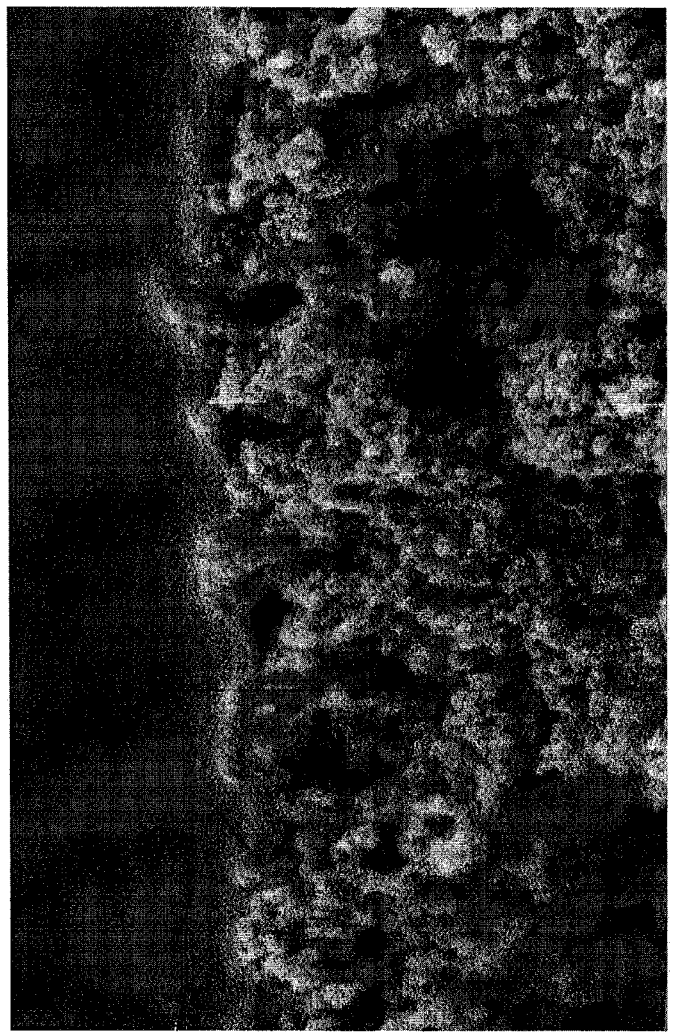
FIG. 6

MEMBRANE ELECTRODE ASSEMBLY MANUFACTURING PROCESS

This invention was made under a contract with an agency of the U.S. Government. The name of the U.S. Government agency is Department of Energy (Golden Field Office), and the U.S. Government contract number is DE-FC36-08GO18052.

BACKGROUND

A proton exchange membrane (hereinafter "PEM") fuel cell membrane electrode assembly (hereinafter "MEA") is comprised of an ionomer membrane with an anode electrode on one side and a cathode electrode on the other side. The membrane and electrodes are typically formed as separate layers and are bonded together with heat and/or pressure to form a composite sheet, known as a membrane-electrode assembly. A preferred method in which the layers are coated on top of each other in an efficient and cost-effective manner is desirable and is described below.

BRIEF DESCRIPTION OF THE DRAWINGS

FIG. 1 is a schematic of an exemplary step of the disclosed method.

FIG. 2 is a schematic of an exemplary step of the disclosed method.

FIG. 3 is a schematic of an exemplary step of the disclosed method.

FIG. 4 is a schematic of an exemplary step of the disclosed method.

FIG. 5 is an exemplary construction of an air-permeable backer.

FIG. 6 is a scanning electron microscope image of an exemplary construction of a protective ionomer layer adjacent to an electrode.

SUMMARY

The present disclosure includes a method of making a component for a membrane electrode assembly comprising the steps of (a) providing an air-permeable backer, (b) depositing an electrode onto the backer, and (c) depositing a mixture containing an ionomer on the electrode and drying the mixture to form a protective and continuous ionomer layer. Preferably, the air-permeable backer comprises an expanded polymer having release characteristics which enable the MEA to be peeled off of the backer, such as expanded polytetrafluoroethylene (hereinafter "ePTFE"). Also preferably, the expanded polymer has a mass per area of less than about 16 g/m$^2$, a bubble point of greater than about 70 psi, and a Z-strength sufficient to prevent cohesive failure of the expanded polymer when the electrode is peeled off of the air-permeable backer. A further embodiment includes the step of coupling a fabric to the expanded polymer, where the fabric is preferably polyester, less than about 0.006 inches thick, has a mass/area of less than about 65 g/yd$^2$, and is dimensionally stable within +/−4% throughout the manufacturing process, such that the web can be handled on a roll to roll process without defects caused by web stretching or web shrinking. A further embodiment includes the step of bonding the fabric to the backer with a discontinuous adhesive pattern. Preferably, the fabric is dot-laminated to the backer with a urethane adhesive. A further embodiment includes an adhesive that has low swelling in the presence of water and alcohol, as described in Henn, U.S. Pat. No. 4,532,316. In a further embodiment, the air-permeable backer is a gas diffusion layer.

Also preferably, the protective ionomer layer is the dried form of a wet layer that comprises a water-insoluble alcohol. The ionomer is preferably a perfluorosulfonic acid (hereinafter "PFSA"), and the wet layer is preferably aqueous and comprises greater than about 60 wt % water, more preferably greater than about 90% water. The wet layer comprises less than about 10 wt % of the water-insoluble alcohol, and preferably less than 3 wt % of the water-insoluble alcohol. The water-insoluble alcohol is preferably hexanol. In an alternative embodiment, the wet layer further comprises a water-soluble alcohol or glycol ether, which preferably comprises less than about 10 wt % of the mixture. The water-soluble alcohol is preferably isopropanol, preferably present in an amount of less than about 5 wt %. The glycol ether is preferably dipropylene glycol (hereinafter "DPG") or propylene glycol methyl ether (hereinafter "PGME"), preferably present in an amount of less than about 5 wt %. The protective ionomer layer is formed after the water, hexanol, and other optional additives are allowed to evaporate as in an oven at elevated temperature (up to ~200° C.).

In a further embodiment, the disclosed method includes a further step (d) depositing a proton conducting layer onto the protective ionomer layer. Preferably, the proton conducting layer comprises an ionomer and a reinforcement. Preferably, the reinforcement comprises an ePTFE membrane. In further embodiments, the method may comprise the step of depositing a second ionomer layer onto the proton conducting layer. In further embodiments, the method may comprise the step of depositing another electrode onto said proton conducting layer or said second ionomer layer.

In all embodiments, the protective ionomer layer preferably has a thickness of about 0.1 to about 25 microns, more preferably about 0.1 to about 10 microns, and still more preferably about 0.1 to about 3 microns.

DETAILED DESCRIPTION

The disclosed method includes the steps described below and illustrated in the Figures. Although described as sequential steps for purposes of explanation, this disclosure contemplates that in practice the steps may be performed in any order or simultaneously. In all of the Figures, reference numeral 10 represents a roll feed or roll wind.

Step 1

As illustrated in FIG. 1, first electrode mixture 102 is coated and dried to form dried electrode 103 on a substrate 101 with sufficient mechanical properties for continuous web handling. The substrate 101 must be sufficiently air permeable to eliminate air-displacement defects in Step 2, described below. The substrate 101 in one embodiment is a backer or a release layer; in alternative embodiments the substrate may be a gas diffusion layer.

Electrodes for PEM fuel cells are typically coated on release layers. These layers need to have sufficient release, heat tolerance, mechanical properties for continuous web handling, surface uniformity, and must not interact chemically in a way that degrades electrode performance. Incumbent materials include Kapton® (DuPont), skived polytetrafluoroethylene (PTFE), and fluoropolymer-coated polyester films. Expanded PTFEs (ePTFEs) have been used but they usually lack robust web handling properties (they are conventionally prone to stretching, shrinkage, etc.) even with high mass/area (>50 g/m2). Additionally, all of these release layers are expensive due to raw material or manufacturing costs. Similarly, substrate 101 needs to have sufficient release, heat tolerance, mechanical properties for continuous web handling, surface uniformity, must not interact chemically in a way that degrades electrode performance, and be provided at low cost. We have identified ePTFE laminates that can be used for substrate 101 that provide the necessary properties at low cost.

Specifically, polymer webs with low mass, high Z-strength, and relatively tight pore sizes are disclosed herein to provide the required release properties for electrodes. These polymers are preferably expanded polymers such as ePTFE. The release characteristics are defined herein as the ability to be peeled away from the electrode without leaving significant visible traces of electrode on the substrate 101 nor allowing cohesive failure of the polymer web. Also preferably, the air-permeable substrate 101 comprises ePTFE having a mass per area of less than about 16 g/m$^2$ (measurements executed in accordance to U.S. Pat. No. 7,306,729 B2), a bubble point of greater than about 70 psi (measurements executed in accordance to U.S. Pat. No. 7,306,729 B2, with device manufactured by Porous Materials, Inc. in Ithaca, N.Y.; hereinafter "PMI"), and a Z-strength sufficient to prevent cohesive failure when the electrode is peeled off the air-permeable backer (subject to the same visual test mentioned above).

In one embodiment, the substrate 101 comprises of at least two layers, layer 101a and layer 101b. As depicted in FIG. 5 an air-permeable layer 101a (such as ePTFE with mass per area of less than 16 g/m$^2$) maybe laminated to a low-cost support 101b (a woven polyester such as 9000000322 US 101 (751125) PFP supplied by Milliken & Co. in Spartanburg, S.C.) that is also air permeable by means of a thermoplastic or other adhesive 101c element. The 101c element is compatible with the electrode mixture 102. If an adhesive is used, element 101c must be applied in a discontinuous (non-monolithic) discrete pattern to permit air permeability. Preferably, the low-cost support 101b has a thickness of less than about 0.006 inches and has a mass/area of less than about 65 g/yd$^2$. Preferably, the substrate 101 construction is dimensionally stable within +/−4% throughout the manufacturing process. Preferably, the low cost fabric support is made of polyester laminated to, for example, an ePTFE substrate using a solvent-stable urethane adhesive, as described in Henn, U.S. Pat. No. 4,532,316, applied in a gravure dot pattern. These woven polyester supports provide superior web handling properties while maintaining the required chemical and thermal performance.

Step 2

FIG. 2 shows Step 2 of a continuous process for manufacturing a MEA. After a substantially dried electrode 103 has been formed on substrate 101 in Step 1, slot die 11 deposits an aqueous wet layer 104, comprising an aqueous ionomer mixture, onto the dried or substantially dried electrode 103. Preferably slot die 11 deposits an aqueous mixture comprising a perfluorosulfonic acid (PFSA) ionomer such as Nafion® (DuPont) and a water-insoluble alcohol, to form the aqueous wet layer 104. Coating methods other than slot die may also be used. This aqueous wet layer 104 is processed through the drying segment 12, resulting in a substantially dry protective ionomer layer 105.

Traditionally after the first electrode layer has been formed, a proton-conducting ionomer membrane layer is added on top of it, typically by hot lamination of the two dry layers. ePTFE reinforced ionomer layers are preferred, as they have mechanical properties which increase the durability of the MEA. However, if the mixtures of ionomer, water, and a water-soluble alcohol such as ethanol that are typically used to make ePTFE-reinforced proton-conducting films are coated directly on top of an electrode layer, they will penetrate, dissolve, and/or otherwise disrupt the dried electrode 103, greatly reducing the electrochemical efficiency of the electrode. Therefore, according to the present disclosure, the formation of a thin, protective ionomer layer 105 on the electrode prevents disruption of the electrode as described above. This protective ionomer layer 105 has a thickness of about 0.1 to about 25 microns, preferably about 0.1 to about 10 microns, and most preferably about 0.5 to about 3 microns.

It is difficult to coat films composed of water and perfluorosulfonic acid (PFSA) ionomer on top of porous and/or hydrophobic surfaces or substrates, such as PEM electrodes. The coating mixture needs to have sufficiently low surface tension to wet the surface of the hydrophobic substrate. Low surface tension can be achieved with high concentrations (>~30 wt %) of water-soluble alcohols, such as ethyl alcohol, methyl alcohol, and isopropyl alcohol (hereinafter "IPA"). These coating solutions tend to reticulate during drying, resulting in non-uniformities such as thickness variations, holes, and wavy-edge defects. Furthermore, high concentrations of water-soluble alcohols can dissolve or disrupt the electrode substrate. On porous substrates, there is the additional problem that coating solutions with low surface tension will penetrate the pores in the electrode substrate. In order to minimize this penetration, the alcohol content can be reduced, but this causes poor wetting at the interface of the coating and the substrate which leads to de-wetting film defects.

We discovered that a water-insoluble alcohol such as hexanol formed stable non-separating aqueous mixtures with PFSA ionomer that behave like oil-in-water emulsions. These mixtures permit wetting and monolithic film formation on top of porous and/or hydrophobic electrode substrates. These mixtures reduce the contact angle of the ionomer solution on fuel cell electrode layers. Specifically, 1-hexanol at 1-2 wt % lowered the surface tension of a solution of 5 wt % PFSA ionomer in water from 55 dynes/cm to 28 dynes/cm. Surprisingly, the PFSA ionomer, which is not considered a surfactant, acts like it emulsifies water-insoluble alcohols. During evaporation of this mixture, the film remains intact and does not reticulate or form de-wetting defects. Furthermore, there is no significant disruption of dried electrode 103 by the aqueous wet layer 104 or the protective ionomer layer 105, as depicted in the SEM cross-section image of FIG. 6. Furthermore the protective ionomer layer 105 has no negative influence on the electrochemical performance of the dried electrode 103.

Preferably, the aqueous wet layer 104 is aqueous and comprises greater than about 60 wt % water, more preferably greater than about 90% water. The aqueous wet layer 104 comprises less than about 10 wt % of the water-insoluble alcohol, preferably less than about 5 wt % of the water-insoluble alcohol. In an alternative embodiment, the aqueous wet layer 104 further comprises a water-soluble alcohol, which preferably comprises less than about 10 wt % of the water-soluble alcohol. The water-soluble alcohol is preferably isopropanol, preferably present in an amount of less than about 5 wt %. The aqueous wet layer 104 further comprises less than about 10 wt % of a glycol ether. The glycol ether is preferably dipropylene glycol or propylene glycol methyl ether, preferably present in an amount of less than about 5 wt %.

These stable aqueous mixtures of hexanol and PFSA ionomer have been demonstrated with slot die and draw-down bar coating methods in batch coating and in continuous roll-to-roll processes. After coating the aqueous wet layer 104, heat is applied to remove water and other volatile components, resulting in a substantially dry protective ionomer layer 105, a monolithic solid film.

If the substrate 101 is not sufficiently air permeable, bubble defects will disrupt the coating. These defects can allow the ionomer/alcohol/water solution applied in Step 3 (ionomer mixture 106) to penetrate and/or dissolve the dried electrode 103 which was coated in Step 1, thus reducing electrochemical performance and/or durability.

An aqueous mixture of about 90 wt % water, 5 wt % ionomer, 3 wt % hexanol, and 2 wt % IPA was coated with a slot die and substantially dried at an oven temperature of 140° C. for 3 minutes to form a protective monolithic film of ionomer on the surface of a cathode electrode layer without substantial penetration of the protective ionomer layer into the electrode layer. The protective ionomer layer had a thickness of about 2 microns. A beginning-of-life polarization measurement indicated that the coated ionomer layer formed an ionically-conductive interface and that the electrode structure was uncompromised by the ionomer coating. Two other water-insoluble alcohols (pentanol, 2-ethyl hexanol) were used in alternative embodiments to form top coats of ionomer on electrode surfaces. Optionally, water-soluble compounds (such as IPA, DPG, PGME) are also added and are found to be compatible with the mixture. These water-soluble compounds improved film formation and/or film stability during coating and drying.

Step 3 (Optional)

A composite wet layer 108, preferably an ePTFE-reinforced ionomer layer, is formed on top of the protective ionomer layer 105. In the composite wet layer 108, the ionomer mixture 106 preferably substantially impregnates the microporous ePTFE 107 to render an interior volume of the ePTFE substantially occlusive, as described in Bahar et al, U.S. Pat. No. RE 37,307, thereby forming the composite wet layer 108. Subsequent heat treatment of composite wet layer 108 through the drying segment 12, results in formation of dried composite layer 109. Alternatively, an unreinforced ionomer may be used in place of a composite wet layer.

Step 3A (Optional)

Optionally an ionomer mixture coating can be applied to the dried composite layer 109, resulting in formation of a second wet layer and if optionally dried it will result in the formation of a second ionomer layer.

Step 4 (Optional)

Optionally a second wet electrode layer 110 is coated on 109 (or a second ionomer layer if step 3A takes place) and will result in a second electrode layer 111 after heat treatment, thus completing the membrane-electrode assembly.

What is claimed is:

1. A method of making a component for a membrane electrode assembly comprising the steps of:
   (a) providing an air-permeable backer;
   (b) depositing an electrode onto said backer;
   (c) depositing an aqueous wet layer comprising a fluoroionomer mixture comprising a water-insoluble alcohol and an ionomer onto said electrode;
   (d) substantially drying said wet layer to form a protective ionomer layer; and
   (e) depositing, after substantially drying said wet layer, a proton conducting composite wet layer onto said protective ionomer layer, wherein the proton conducting composite wet layer has an occlusive interior volume.

2. A method as defined in claim 1 wherein the air-permeable backer comprises an expanded polymer having release characteristics.

3. A method as defined in claim 2 wherein the expanded polymer is ePTFE.

4. A method as defined in claim 3 wherein said expanded polymer has a mass per area of less than about 16 g/m² of ePTFE.

5. A method as defined in claim 3 wherein said expanded polymer has a bubble point of greater than about 70 psi.

6. A method as defined in claim 3 wherein said air-permeable backer has a Z-strength sufficient to prevent cohesive failure of said ePTFE when said electrode is peeled off of said air-permeable backer.

7. A method as defined in claim 1 wherein the air-permeable backer is a gas diffusion layer.

8. A method as defined in claim 1 further comprising coupling a fabric to said backer.

9. A method as defined in claim 8 wherein said air-permeable backer is dimensionally stable within +/−4% throughout the manufacturing process.

10. A method as defined in claim 8 wherein said fabric comprises polyester.

11. A method as defined in claim 8 wherein said fabric has a thickness of less than about 0.006 inches.

12. A method as defined in claim 8 wherein said fabric has a mass/area of less than about 64 g/yd².

13. A method as defined in claim 8 further comprising the step of bonding said fabric to said backer with an adhesive in a discontinuous pattern.

14. A method as defined in claim 13 wherein said fabric is dot-laminated to said backer with a urethane adhesive.

15. A method as defined in claim 13 wherein said adhesive is a solvent-resistant adhesive.

16. A method as defined in claim 1 wherein said ionomer is perfluorosulfonic acid (PFSA) ionomer.

17. A method as defined in claim 1 wherein said wet layer is aqueous and comprises greater than about 60 wt % water.

18. A method as defined in claim 1 wherein said wet layer is aqueous and comprises greater than about 90 wt % water.

19. A method as defined in claim 1 wherein said wet layer is aqueous and comprises less than about 3 wt % of said water-insoluble alcohol.

20. A method as defined in claim 1 wherein said wet layer is aqueous and comprises less than about 5 wt % of said water-insoluble alcohol.

21. A method as defined in claim 1 wherein said water-insoluble alcohol comprises hexanol.

22. A method as defined in claim 1 wherein said wet layer further comprises a water-soluble alcohol.

23. A method as defined in claim 22 wherein said wet layer comprises less than about 10 wt % of said water-soluble alcohol.

24. A method as defined in claim 22 wherein said water-soluble alcohol comprises glycol ether present in an amount of less than about 5 wt %.

25. A method as defined in claim 1 wherein said proton conducting composite wet layer comprises an ionomer.

26. A method as defined in claim 1 wherein said proton conducting composite wet layer comprises a reinforcement.

27. A method as defined in claim 26 wherein said reinforcement comprises an ePTFE membrane.

28. A method as defined in claim 1 further comprising the step of depositing an ionomer layer onto said proton conducting composite wet layer.

29. A method as defined in claim 28 further comprising the step of depositing another electrode onto said ionomer layer.

30. A method as defined in claim 1 further comprising the step of depositing another electrode onto said proton conducting layer.

31. A method as defined in claim 1 wherein said protective ionomer layer has a thickness of about 0.1 to about 25 microns.

32. A method as defined in claim 1 wherein said protective ionomer layer has a thickness of about 0.1 to about 10 microns.

33. A method as defined in claim 1 wherein said protective ionomer layer has a thickness of about 0.1 to about 3 microns.

\* \* \* \* \*